(12) United States Patent
Hansen et al.

(10) Patent No.: US 7,149,792 B1
(45) Date of Patent: Dec. 12, 2006

(54) DEVICE REGISTRATION MECHANISM

(75) Inventors: James R. Hansen, Franklin, MA (US); Dale E. Calder, Mansfield, MA (US)

(73) Assignee: Axeda Corporation, Foxboro, MA (US)

( * ) Notice: Subject to any disclaimer, the term of this patent is extended or adjusted under 35 U.S.C. 154(b) by 369 days.

(21) Appl. No.: 09/716,717

(22) Filed: Nov. 20, 2000

(51) Int. Cl.
*G06F 15/177* (2006.01)

(52) U.S. Cl. ..................................... 709/220

(58) Field of Classification Search .............. 709/217, 709/220, 223, 250; 395/200.1
See application file for complete search history.

(56) References Cited

U.S. PATENT DOCUMENTS

| | | | |
|---|---|---|---|
| 4,086,434 A | 4/1978 | Bocchi | |
| 4,412,292 A | 10/1983 | Sedam et al. | |
| 4,497,037 A | 1/1985 | Kato et al. | |
| 4,583,834 A | 4/1986 | Seko et al. | |
| 4,853,946 A | 8/1989 | Elliott et al. | |
| 4,962,368 A | 10/1990 | Dobrzanski et al. | |
| 4,964,065 A | 10/1990 | Hicks et al. | |
| 4,965,946 A | 10/1990 | Hegedus et al. | |
| 4,996,703 A | 2/1991 | Gray | |
| 5,038,319 A | 8/1991 | Carter et al. | |
| 5,057,866 A | 10/1991 | Hill, Jr. et al. | |
| 5,077,582 A | 12/1991 | Kravette et al. | |
| 5,084,875 A | 1/1992 | Weinberger et al. | |
| 5,129,080 A | 7/1992 | Smith | |
| 5,138,377 A | 8/1992 | Smith et al. | |
| 5,184,179 A | 2/1993 | Tarr et al. | |
| 5,204,699 A | 4/1993 | Birnbaum et al. | |
| 5,212,645 A | 5/1993 | Wildes et al. | |
| 5,214,772 A | 5/1993 | Weinberger et al. | |
| 5,216,461 A | 6/1993 | Maekawa et al. | |
| 5,220,380 A | 6/1993 | Hirata et al. | |
| 5,224,157 A | 6/1993 | Yamada et al. | |
| 5,243,382 A | 9/1993 | Takano et al. | |
| 5,257,069 A | 10/1993 | Hirata et al. | |
| 5,261,061 A | 11/1993 | Ju | |
| 5,270,775 A | 12/1993 | Suzuki | |
| 5,282,127 A | 1/1994 | Mii | |
| 5,291,244 A | 3/1994 | Kajiwara et al. | |
| 5,293,196 A | 3/1994 | Kaneko et al. | |
| 5,297,034 A | 3/1994 | Weinstein | |
| 5,297,256 A | 3/1994 | Wolstenholme et al. | |
| 5,300,980 A | 4/1994 | Maekawa et al. | |
| 5,303,005 A | 4/1994 | Takano et al. | |
| 5,305,055 A | 4/1994 | Ebner et al. | |

(Continued)

FOREIGN PATENT DOCUMENTS

JP     60-263162     12/1985

(Continued)

OTHER PUBLICATIONS

Edward F. Steinfeld "Internet-appliance technology automates test equipment" EDN Magazine, pp. 157-169, Oct. 2000, www.edbmag.com.

(Continued)

*Primary Examiner*—David Wiley
*Assistant Examiner*—J. Bret Dennison
(74) *Attorney, Agent, or Firm*—Fish & Richardson P.C.

(57) ABSTRACT

An automated device recordation and registration process for automatically registering, on a remote computer, an embedded device is described. The registration process includes a feature detection process for detecting feature information associated with a device to be registered. A transmission process transmits the feature information to a remote computer at a known address using a self-describing computer language. A registration process registers the device by storing the feature information on the remote computer.

42 Claims, 4 Drawing Sheets

U.S. PATENT DOCUMENTS

| | | |
|---|---|---|
| 5,305,199 A | 4/1994 | LoBiondo et al. |
| 5,307,263 A | 4/1994 | Brown |
| 5,325,156 A | 6/1994 | Ulinski |
| 5,333,286 A | 7/1994 | Weinberger et al. |
| 5,335,048 A | 8/1994 | Takano et al. |
| 5,339,168 A | 8/1994 | Evanitsky et al. |
| 5,342,037 A | 8/1994 | Martin |
| 5,347,346 A | 9/1994 | Shimizu et al. |
| 5,359,391 A | 10/1994 | Kuroyanagi et al. |
| 5,361,265 A | 11/1994 | Weinberger et al. |
| 5,365,310 A | 11/1994 | Jenkins et al. |
| 5,367,667 A | 11/1994 | Wahlquist et al. |
| 5,369,469 A | 11/1994 | Leo et al. |
| 5,369,471 A | 11/1994 | Yamada |
| 5,369,472 A | 11/1994 | Raj et al. |
| 5,373,349 A | 12/1994 | Ito |
| 5,384,622 A | 1/1995 | Hirata et al. |
| 5,386,271 A | 1/1995 | Maekawa et al. |
| 5,392,095 A | 2/1995 | Siegel |
| 5,398,257 A | 3/1995 | Groenteman |
| 5,404,199 A | 4/1995 | Hirata et al. |
| 5,412,779 A | 5/1995 | Motoyama |
| 5,414,494 A | 5/1995 | Aikens et al. |
| 5,420,667 A | 5/1995 | Kaneko et al. |
| 5,424,808 A | 6/1995 | Maekawa et al. |
| 5,424,844 A | 6/1995 | Koyanagi et al. |
| 5,428,551 A | 6/1995 | Trainor et al. |
| 5,442,541 A | 8/1995 | Hube et al. |
| 5,444,517 A | 8/1995 | Nagashima |
| 5,444,851 A | 8/1995 | Woest |
| 5,446,522 A | 8/1995 | Tahara et al. |
| 5,452,057 A | 9/1995 | Imaizumi et al. |
| 5,459,552 A | 10/1995 | Ohira |
| 5,463,775 A | 10/1995 | DeWitt et al. |
| 5,469,353 A | 11/1995 | Pinsky et al. |
| 5,488,454 A | 1/1996 | Fukada et al. |
| 5,491,535 A | 2/1996 | Hirata et al. |
| 5,493,364 A | 2/1996 | Kuroyanagi et al. |
| 5,517,491 A | 5/1996 | Nanni et al. |
| 5,543,892 A | 8/1996 | Hirata et al. |
| 5,548,376 A | 8/1996 | Kikuno |
| 5,550,957 A | 8/1996 | Davidson, Jr. et al. |
| 5,555,191 A | 9/1996 | Hripcsak |
| 5,561,501 A | 10/1996 | Honma |
| 5,572,672 A | 11/1996 | Dewitt et al. |
| 5,586,254 A * | 12/1996 | Kondo et al. .................. 714/25 |
| 5,594,529 A | 1/1997 | Yamashita et al. |
| 5,600,403 A | 2/1997 | Inoo |
| 5,603,060 A | 2/1997 | Weinberger et al. |
| 5,603,323 A | 2/1997 | Pflugrath et al. |
| 5,619,024 A | 4/1997 | Kolls |
| 5,631,724 A | 5/1997 | Sawada et al. |
| 5,636,008 A | 6/1997 | LoBiondo et al. |
| 5,636,333 A | 6/1997 | Davidson, Jr. et al. |
| 5,638,427 A | 6/1997 | Flemming et al. |
| 5,640,495 A | 6/1997 | Colbert et al. |
| 5,642,202 A | 6/1997 | Williams et al. |
| 5,642,208 A | 6/1997 | Takahashi et al. |
| 5,655,084 A | 8/1997 | Pinsky et al. |
| 5,659,794 A | 8/1997 | Caldarale et al. |
| 5,673,190 A | 9/1997 | Kahleck et al. |
| 5,675,744 A | 10/1997 | Tsujii |
| 5,677,775 A | 10/1997 | Yamaguchi et al. |
| 5,694,528 A | 12/1997 | Hube |
| 5,699,494 A | 12/1997 | Colbert et al. |
| 5,708,908 A | 1/1998 | Hirata et al. |
| 5,708,909 A | 1/1998 | Yamashita et al. |
| 5,715,393 A | 2/1998 | Naugle |
| 5,715,496 A | 2/1998 | Sawada et al. |
| 5,715,823 A | 2/1998 | Wood et al. |
| 5,720,015 A | 2/1998 | Martin et al. |
| 5,727,135 A | 3/1998 | Webb et al. |
| 5,732,212 A | 3/1998 | Perholz et al. |
| 5,736,965 A | 4/1998 | Mosebrook et al. |
| 5,740,801 A | 4/1998 | Branson |
| 5,745,268 A | 4/1998 | Eastvold et al. |
| 5,748,907 A | 5/1998 | Crane |
| 5,752,125 A | 5/1998 | Yamashita et al. |
| 5,752,128 A | 5/1998 | Yamashita |
| 5,752,917 A | 5/1998 | Fuchs |
| 5,761,529 A | 6/1998 | Raji et al. |
| 5,764,918 A | 6/1998 | Poulter |
| 5,768,516 A | 6/1998 | Sugishima |
| 5,772,585 A | 6/1998 | Lavin et al. |
| 5,774,052 A | 6/1998 | Hamm et al. |
| 5,786,994 A | 7/1998 | Friz et al. |
| 5,787,149 A | 7/1998 | Yousefi et al. |
| 5,787,278 A | 7/1998 | Barton et al. |
| 5,790,793 A | 8/1998 | Higley |
| 5,790,977 A | 8/1998 | Exekiel |
| 5,798,738 A | 8/1998 | Yamada |
| 5,801,964 A | 9/1998 | McCarthy |
| 5,809,237 A | 9/1998 | Watts et al. ........... 395/200.32 |
| 5,812,397 A | 9/1998 | Pech et al. |
| 5,812,874 A | 9/1998 | Yamashita et al. |
| 5,818,603 A | 10/1998 | Motoyama |
| 5,819,015 A | 10/1998 | Martin et al. |
| 5,819,110 A | 10/1998 | Motoyama |
| 5,822,221 A | 10/1998 | Groenteman |
| 5,828,943 A | 10/1998 | Brown |
| 5,835,816 A | 11/1998 | Sawada et al. |
| 5,844,550 A | 12/1998 | Trainor et al. |
| 5,845,230 A | 12/1998 | Lamberson |
| 5,857,967 A | 1/1999 | Frid et al. |
| 5,862,404 A | 1/1999 | Onaga |
| 5,865,745 A | 2/1999 | Schmitt et al. |
| 5,872,635 A | 2/1999 | Akiyama |
| 5,873,009 A | 2/1999 | Yamashita et al. |
| 5,873,659 A | 2/1999 | Edwards et al. |
| 5,878,746 A | 3/1999 | Lemelson et al. |
| 5,880,677 A | 3/1999 | Lestician |
| 5,884,072 A | 3/1999 | Rasmussen |
| 5,887,216 A | 3/1999 | Motoyama |
| 5,890,029 A | 3/1999 | Hirata et al. |
| 5,894,416 A | 4/1999 | Kuroyanagi et al. |
| 5,897,235 A | 4/1999 | Honma |
| 5,901,286 A | 5/1999 | Danknick et al. |
| 5,905,906 A | 5/1999 | Goffinet et al. |
| 5,909,493 A | 6/1999 | Motoyama et al. |
| 5,911,095 A | 6/1999 | Atsumi et al. |
| 5,917,405 A | 6/1999 | Joao |
| 5,933,675 A | 8/1999 | Sawada et al. |
| 5,935,060 A | 8/1999 | Iliff |
| 5,956,487 A | 9/1999 | Venkatraman et al. |
| 5,956,698 A | 9/1999 | Lachese et al. |
| 5,968,116 A * | 10/1999 | Day et al. .................... 709/202 |
| 5,970,149 A | 10/1999 | Johnson |
| 5,975,737 A | 11/1999 | Crater et al. |
| 6,003,061 A | 12/1999 | Jones et al. |
| 6,003,078 A | 12/1999 | Kodimer et al. |
| 6,006,045 A | 12/1999 | Miyawaki |
| 6,009,284 A | 12/1999 | Weinberger et al. |
| 6,012,088 A * | 1/2000 | Li et al. .................... 709/219 |
| 6,014,631 A | 1/2000 | Teagarden et al. |
| 6,014,691 A | 1/2000 | Brewer et al. |
| 6,021,284 A | 2/2000 | Serizawa et al. |
| 6,022,315 A | 2/2000 | Iliff |
| 6,023,223 A | 2/2000 | Baxter, Jr. |
| 6,023,507 A | 2/2000 | Wookey |
| 6,025,925 A | 2/2000 | Davidson, Jr. et al. |
| 6,031,964 A | 2/2000 | Anderson |
| 6,042,111 A | 3/2000 | Rivers et al. |
| 6,060,994 A | 5/2000 | Chen |
| 6,061,603 A | 5/2000 | Papadopoulos et al. |

| | | |
|---|---|---|
| 6,064,915 A | 5/2000 | Kaneko et al. |
| 6,091,915 A | 7/2000 | Takagishi |
| 6,098,116 A * | 8/2000 | Nixon et al. .................... 710/8 |
| 6,101,407 A | 8/2000 | Groezinger |
| 6,108,492 A | 8/2000 | Miyachi |
| 6,112,035 A | 8/2000 | Kuroyanagi et al. |
| 6,112,256 A | 8/2000 | Goffinet et al. |
| 6,115,489 A | 9/2000 | Gupta et al. |
| 6,119,934 A | 9/2000 | Kolls |
| 6,122,463 A | 9/2000 | Nagatani |
| 6,130,999 A | 10/2000 | Serizawa et al. |
| 6,139,177 A | 10/2000 | Venkatraman et al. |
| 6,152,365 A | 11/2000 | Kolls |
| 6,167,448 A | 12/2000 | Hemphill et al. |
| 6,181,331 B1 | 1/2001 | Trainor et al. |
| 6,189,113 B1 | 2/2001 | Rabb et al. |
| 6,196,735 B1 | 3/2001 | Inamine |
| 6,221,011 B1 | 4/2001 | Bardy |
| 6,230,199 B1 * | 5/2001 | Revashetti et al. ......... 709/224 |
| 6,246,485 B1 | 6/2001 | Brown et al. |
| 6,260,148 B1 | 7/2001 | Aggarwal et al. |
| 6,260,248 B1 | 7/2001 | Cramer et al. |
| 6,282,454 B1 | 8/2001 | Papadopoulos et al. |
| 6,286,059 B1 | 9/2001 | Sugiura |
| 6,292,828 B1 | 9/2001 | Williams |
| 6,304,895 B1 | 10/2001 | Schneider et al. |
| 6,311,024 B1 | 10/2001 | Serizawa et al. |
| 6,312,378 B1 | 11/2001 | Bardy |
| 6,317,783 B1 | 11/2001 | Freishtat et al. |
| 6,317,848 B1 | 11/2001 | Sorens et al. |
| 6,325,540 B1 | 12/2001 | Lounsberry et al. |
| 6,343,320 B1 | 1/2002 | Fairchild et al. |
| 6,356,949 B1 | 3/2002 | Katsandres et al. |
| 6,368,284 B1 | 4/2002 | Bardy |
| 6,370,582 B1 | 4/2002 | Lim et al. |
| 6,377,162 B1 | 4/2002 | Delestienne et al. |
| 6,381,557 B1 | 4/2002 | Babula et al. |
| 6,397,212 B1 | 5/2002 | Biffar |
| 6,405,310 B1 * | 6/2002 | Simpson ..................... 713/1 |
| 6,406,426 B1 | 6/2002 | Reuss et al. |
| 6,415,023 B1 * | 7/2002 | Iggulden ................ 379/102.03 |
| 6,426,798 B1 | 7/2002 | Yeung |
| 6,430,711 B1 | 8/2002 | Sekizawa et al. |
| 6,434,572 B1 | 8/2002 | Derzay et al. |
| 6,437,692 B1 | 8/2002 | Petite et al. |
| 6,446,192 B1 * | 9/2002 | Narasimhan et al. ......... 712/29 |
| 6,449,633 B1 | 9/2002 | Van et al. |
| 6,457,038 B1 | 9/2002 | Defosse |
| 6,462,831 B1 | 10/2002 | Akiyama |
| 6,466,971 B1 * | 10/2002 | Humpleman et al. ....... 709/220 |
| 6,477,117 B1 | 11/2002 | Narayanaswami et al. |
| 6,487,513 B1 | 11/2002 | Eastvold et al. |
| 6,494,831 B1 | 12/2002 | Koritzinsky |
| 6,510,350 B1 | 1/2003 | Steen, III et al. |
| 6,523,130 B1 | 2/2003 | Hickman et al. |
| 6,529,848 B1 | 3/2003 | Sone |
| 6,549,612 B1 | 4/2003 | Gifford et al. |
| 6,560,611 B1 | 5/2003 | Nine et al. |
| 6,560,656 B1 * | 5/2003 | O'Sullivan et al. ......... 709/250 |
| 6,564,227 B1 | 5/2003 | Sakakibara et al. |
| 6,581,092 B1 | 6/2003 | Motoyama et al. |
| 6,581,094 B1 * | 6/2003 | Gao ........................ 709/220 |
| 6,587,812 B1 | 7/2003 | Takayama |
| 6,598,011 B1 | 7/2003 | Howards Koritzinsky et al. |
| 6,601,159 B1 | 7/2003 | Smith et al. |
| 6,604,212 B1 | 8/2003 | Sekizawa et al. |
| 6,611,863 B1 * | 8/2003 | Banginwar ................ 709/220 |
| 6,631,407 B1 | 10/2003 | Mukaiyama et al. |
| 6,636,899 B1 | 10/2003 | Rabb et al. |
| 6,651,110 B1 | 11/2003 | Caspers et al. |
| 6,651,190 B1 | 11/2003 | Worley et al. |
| 6,654,720 B1 * | 11/2003 | Graham et al. ............. 704/270 |
| 6,670,810 B1 | 12/2003 | Duncan et al. |
| 6,681,349 B1 | 1/2004 | Sekizawa |
| 6,686,838 B1 * | 2/2004 | Rezvani et al. ............. 340/506 |
| 6,691,106 B1 | 2/2004 | Sathyanarayan |
| 6,710,893 B1 | 3/2004 | Hou et al. |
| 6,711,618 B1 | 3/2004 | Danner et al. |
| 6,757,714 B1 | 6/2004 | Hansen |
| 6,834,298 B1 * | 12/2004 | Singer et al. ................ 709/220 |
| 6,857,013 B1 | 2/2005 | Ramberg et al. |
| 2002/0006790 A1 | 1/2002 | Blumenstock et al. |
| 2002/0038320 A1 | 3/2002 | Brook |
| 2002/0064138 A1 | 5/2002 | Saito et al. |
| 2003/0118353 A1 | 6/2003 | Baller |

FOREIGN PATENT DOCUMENTS

| | | |
|---|---|---|
| JP | 06062130 | 3/1994 |
| JP | 07325513 | 12/1995 |
| JP | 09163008 | 6/1997 |
| JP | 10190922 | 7/1998 |
| JP | 10224372 | 8/1998 |
| JP | 10-295788 | 4/2000 |
| JP | 2000-122952 | 4/2000 |
| WO | WO 98/20439 | 5/1998 |
| WO | WO 98/33302 | 7/1998 |
| WO | WO 98/38910 | 9/1998 |
| WO | WO 98/41943 | 9/1998 |
| WO | WO 99/21336 | 4/1999 |
| WO | WO 99/57649 | 11/1999 |
| WO | WO 99/57837 | 11/1999 |
| WO | WO 99/57838 | 11/1999 |
| WO | WO 00/23894 | 4/2000 |
| WO | WO 02/10919 | 2/2002 |
| WO | WO 02/21239 | 3/2002 |
| WO | WO 02/21299 | 3/2002 |
| WO | WO 02/21414 | 3/2002 |
| WO | WO 02/21414 A1 | 3/2002 |
| WO | WO 02/21415 | 3/2002 |
| WO | WO 02/21777 | 3/2002 |
| WO | WO 02/25501 | 3/2002 |

OTHER PUBLICATIONS

Tom Williams "Java Goes To Work Controlling Networked Embedded Systems" Computer Design, Pennwell Publ. Littleton, MA, 35:9:36-37, Aug. 1996.

"Siemens Medical, BJC Health System Extend deal to multivendor service," Medical Imaging News, vol. 6, No. 26, Jun. 27, 1997.

Mar. 8, 2005 Office Action from application 01 973 431.8.

Math Markup Language (Chapter 4): www.w3.org/TR/REC-MathML/chap4_4.html.

Memphis Educational Computer Connectivity Alliance (MECCA) www.mecca.org/~ltague/nsfnocostextension.html.

EBITS: Electronic Business & Information Technology for Society Research Consortium www.cs.dartmouth.edu/~makedon/cs188/proposal.html.

Xerox 190 Copier, Electronic Data Interface Operator Guide, ver. 1.0, 1989.

Lindley, David, "Xerox unveils copier that phones for help," Rochester Democrat and Chronicle, Mar. 28, 1990.

Rytting, Todd, "Dispensing the Goods, Embedded Style," Circuit Cellar Online, Oct. 1999.

Ennis, Darach, "Cobra and XML Integration in Enterprise Systems," Trinity College Dublin, IONA Technologies Inc.

Emmerich et al., "Implementing Incremental Code Migration with XML," University College London, 2000.

Suresh et al., "XML-Based Data Systems for Earth Science Applications," Raytheon Information Technology and Scientific Services, Lanham, MD, 2000.

Oct. 6, 1998, "Frequently Asked Questions about the Extensible Markup Language—The XML FAQ" Version 1.41 (http://www.oasis-open.org/cover/xmlFAQ141-19981006.html).

Jun. 20, 1997, Layman, et al., "XML-Data," Position Paper from Microsoft Corp. (http://www.oasis-open.org/cover/xml-data9706223.html).

Pfeiffer, R., "Tutorial 2: Writing XML Documents," 1999.
Luh, James C., "With several specs complete, XML enters widespread development," Internet World, Jan. 4, 1999.
Kimball, Ralph, "XML Will Make it Easier," Intelligent Enterprise (http://www.intelligententerprise.com/010507/webhouse1_1.jhtml).
Kovar, Joseph, "Xerox Unveils Expanded Channel Lineup; Also Plans to Introduce E-Mail, Queue Management Software," PC Expo, Jun. 18, 1999.
EmWare Press Release: "Motorola, Mitsubishi and National Semiconductor Join emWare's Embed The Internet Alliance," Chicago, IL, Mar. 2, 1999.
EmWare Press Release: "emWare's emLink™ Used to Internet-enable Welch Allyn's Vital Signs Monitor," Chicago, IL Mar. 2, 1999.
EmWare Press Release: "emWare, IBM Demonstrate Next Phase in Establishing Worldwide Access to Embedded Devices," Chicago, IL Mar. 2, 1999.
EmWare Press Release: "Invensys Selects emWare EMIT Device-Networking Software to Add Remote Monitoring and Control Capabilities to its Controller Products," Salt Lake City, Utah Jun. 14, 1999.
EmWare Press Release: "emWare Delivers EMIT 3.0 SDK Pro-A Complete Device Networking Kit for Developing End-to-end, Embedded Device Networking Solutions," Salt Lake City, Utah May 24, 1999.
EmWare Press Release: "emWare Announces Support for Sun Microsystems Jini Technology," Salt Lake City, Utah Feb. 17, 1999.
Trewitt, G., "Digital Network Systems Laboratory, NSL Technical Note TN-14, Using Tcl to Process HTML Forms".
Jennyc, Kenn S., "Linking Enterprise Business Systems to the Factory Floor," The Hewlett-Packard Journal, Article 9, May 1998.
Walsh, Norman, "XSL The Extensible Style Language: Styling XML Documents," New Architect Daily, Jan. 1999.
Pfeiffer, R., "XML Tutorials for Programmers: Tutorial 2: Writing XML Documents," (http://imb.com/xml).
Winer, Dave, "XML-RPC Specification," (http://XML-RPC.com), Jun. 15, 1999.
Layman, A, et al., "XML-Data," Microsoft Position Paper, Jun. 20, 1997 (http://www.oasis-open.org/cover/xml-data9706223.html).
Sep. 1995, *Medical Imaging*, East Providence, RI.
Eastvold, Roger, "Tiss and Tell," Medical Imaging, Sep. 1995.
Nov. 1996, *24x7*, HealthTech Publishing Company, Inc.
Wigget, Jeremy, "Intraview: Roger Eastvold of Orasis Inc.," *24x7*, Nov. 1996.
Dec. 27, 1995, *SCAN Diagnostic Imaging*, vol. 8, No. 24.
Winter 1992, *Field of View*, vol. 2, No. 3, Toshiba America Medical System, Inc.
Reagan, Kelly, "Technology for the Soul," OC Metro, Sep. 1, 1995.
"Remote Diagnostics: Strategic weapon in the war for multi-vendor service contracts," Tech Assessment, vol. 3, No. 12, Dec. 1995.
Eastvold, Roger, "Services: The Next Generation," The Professional Journal, vol. 20, No. 4.
Apr. 22, 2005 Literature Search by Keyword: CyberTAC.
Steinfeld, E., "Making the Change from Standalone to Internet Appliance," Circuit Cellar Online, Apr. 2000, pp. 1-7.
Allegro, RomWebCLient Embedded HTTP client Toolkit: ALLEGROSOFT, Circuit Cellar Online, Sep. 7, 2000, pp. 1-2, XP-002201983, URL:http://web.archive.orgweb/20000709204234/http://www.allegrosoft.com/romwebclient.html.
"Allegro Software product release overview," Greenhills Software Inc., Jun. 10, 2002, p. 1, URL:http://www.ghs.com/partners/allegro/.
European Office Action mailed Jun. 6, 2005 for Application No. 01955993.9-2211/1305712.
Questra Preliminary Invalidity Contentions dated Apr. 29, 2005.
Box et al., Simple Object Acces Protocol (SOAP) 1.1 Document No. XP002250270, May 8, 2000.
XP-002253876, c:\epodata\sea\eplogf\internal.log.
Issue 77: The Next Bang: The Expolosive Combination of Embedded Linuz, XML, and Instant Mess, http://www.linuxjournal.com/article.php?sid=4195, pp. 1-15.
CyberTAC & RadScape Presentation, May 1997.
CyberTAC from Virtual Impact Systems, Inc. Presentation.
CyberTAC Remote Support System Presentation.
Questra Applications Data Sheet.
CyberTAC Design Presentation.
Orasis Medical Services, Inc., Business Plan Copy No. 001, Nov. 1995.
McBride, R.A., "Security Considerations for Active Messages," ACM SIGICE Bulletin, vol. 22 (2), Oct. 1996.
Hanckmann, J., "Telescript: the emerging standard for intelligent messaging," Philips Telecommunications Review, vol. 52(1).
Lassman, M. et al., "Modern Nuclear Medical Diagnostics with Efficient Gamma Cameras," Electromedica 66(2):43-51 (1998).
Incremona, A. "Remote Service Diagnostics for Imaging Equipment: Today and Tomorrow," Advanced Imaging, 12(9):90(2) (1997).
"The Simple Times, The Quarterly Newsletter of SNMP Technology, Comment, and Events," vol. 7, No. 1, Mar. 1999; wwww.simple-times.org/pub/simple-times/issues/7-1.html.
Tom Williams, "Java Goes to Work Controlling Networked Embedded Systems," Computer Designes, Pennwell Publ. Littleton, MA 35:9:36-37, Aug. 1996.
Edward F. Steinfeld, "Internet-appliance technology automates test equipment," EDN Magazine, pp. 157-169, Oct. 2000, www.edbmag.com.
Database WIP, Section EI, Week 200156, Abstract, Document No. XP002253876 (Korea Electronics & Telecom Res Inst.) Derwent Publications, Ltd., London, GB, Mar. 5, 2001.
WebMethods B2B Whitepaper; www.cs.wisc.edu/~vganti/papers/b2b_wpB2Bintegration.html.
Virtual Reality Transfer Protocol (VRTP); www.stl.nps.navy.mil/~brutzman/vrtp.
Lerner, R., "Introducing SOAP," Linux Journal, pp. 62-70, Mar. 2001.
Communication dated Jun. 22, 2004 in European Application No. 01996048.3.
Communication dated Mar. 11, 2005 in European Application No. 01996048.3.
Communication dated Nov. 8, 2005 in European Application No. 01996048.3.
Communication dated Mar. 9, 2006 in European Application No. 01996048.3.

* cited by examiner

DEVICE REGISTRATION MECHANISM

TECHNICAL FIELD

This invention relates to remote device registration, and more particularly to automated remote device registration which automatically transmits pertinent data to a remote computer.

BACKGROUND

Intelligent devices are employed in various areas today. These devices are utilized in building control and automation systems, power generation systems, industrial controls, and so forth. When these devices are deployed in the field, they often need to communicate with a remote computer system, which monitors information from these devices or controls the devices themselves.

The proliferation of the Internet, home networks, and wireless technology are some of the driving forces behind the increased use of these devices, as the cost of connecting them is dropping quickly.

When configuring these devices, the user must manually register them once they are connected to the network that attaches the device to the remote computer. As the use and number of these devices increase, an automatic method of registering these devices and establishing communication is needed, as it is not feasible to manually maintain device information.

SUMMARY

According to an aspect of this invention, an automated device recordation and registration process for automatically registering, on a remote computer, an embedded device includes a feature detection process for detecting feature information associated with a device to be registered. A feature transmission process transmits the feature information to a remote computer at a known address using a self-describing computer language. A registration process registers the device by storing the feature information on the remote computer.

One or more of the following features may be included. The self-describing computer language includes eXtensible Markup Language (XML). The known address is a Uniform Resource Locator (URL). The known address is a Transmission Control Protocol/Internet Protocol (TCP/IP) address. The feature information includes a device type and a device instance. The device type is a model number and the device instance is a serial number. The remote computer includes a database for storing the feature information. The device registration process includes a device registration status process for examining the database to determine if the device was previously registered on the remote computer and initiating the registration process if the device is not registered. The remote computer resides on a distributed computing network and the feature transmission process transmits the feature information to the remote computer via the distributed computing network. The distributed computing network is the Internet. The device is connected to the distributed computing network via a direct network connection. The device is connected to the distributed computing network via a dial-up network connection. The device is connected to the distributed computing network via a wireless network connection.

One or more of the following features may be included. The device includes embedded software which controls the device's functionality, where the embedded software has a specific version identifier associated with it. The database stores a software update, having a specific version identifier associated with it, for the embedded software of the device, where the software update is the newest version of embedded software available for the device. The device registration process includes a software comparison process for comparing the version identifier of the software update to the version identifier of the embedded software of the device to determine if the embedded software of the device needs to be updated. The device registration process includes a software update process, responsive to the software comparison process determining that the embedded software needs to be updated, for updating the embedded software residing on the device with the software update.

One or more of the following features may be included. The feature information includes system information concerning the location, ownership, and configuration of the device. The device registration process includes a system information interface for allowing the owner of the device to configure the system information. The device includes a HyperText Transfer Protocol (HTTP) device web server and the system information interface is a software application residing on the device web server, where the owner of the device can edit the system information of the device by accessing the system information interface via a remote web client. The device registration process includes a system information transmission process for transmitting the system information to the remote computer using the self-describing computer language and for storing the system information on the database of the remote computer. The system information transmission process includes a system information comparison process for comparing the system information on the remote computer to the system information on the device to determine if the database on the remote computer needs to be updated with the system information on the device. The system information transmission process includes a system information upload process, responsive to the system information comparison process determining that the system information on the database needs to be updated, for updating the system information on the database with the system information on the device.

One or more of the following features may be included. The device includes a device web client and the remote computer includes a HyperText Transfer Protocol (HTTP) remote web server. The remote computer includes an application logic to interface the remote web server and the database. The feature transmission process utilizes the device web client to upload the feature information from the device to the remote web server, where the application logic transfers the feature information from the remote web server to the database. The device includes a device mail client and the remote computer includes a Simple Mail Transfer Protocol (SMTP) remote mail server. The remote computer includes an application logic to interface the remote mail server and the database. The feature transmission process utilizes the device mail client to upload the feature information from the device to the remote mail server, where the application logic transfers the feature information from the remote mail server to the database.

According to a further aspect of this invention, a computer implemented method for registering, on a remote computer, a device embedded in an apparatus, includes detecting feature information associated with a device to be registered. The method transmits the feature information to a remote computer at a known address using a self-describing computer language. The method registers the device by storing the feature information on the remote computer.

One or more of the following features may be included. The computer implemented method further includes examining the database to determine if the device was previously registered on the remote computer and initiating the registration process if the device is not registered. The computer implemented method includes comparing the version identifier of the software update to the version identifier of the embedded software of the device to determine if the embedded software of the device needs to be updated. The computer implemented method includes updating the embedded software residing on the device with the software update if it is determined that the embedded software needs to be updated. The computer implemented method further includes transmitting the system information to the remote computer using the self-describing computer language and storing the system information on the database of the remote computer. The computer implemented method further includes comparing the system information on the remote computer to the system information on the device to determine if the database on the remote computer needs to be updated with the system information on the device. The computer implemented method further includes updating the system information on the database with the system information on the device if it is determined that the system information on the database needs to be updated.

According to a further aspect of this invention, a computer program product residing on a computer readable medium having a plurality of instructions stored thereon which, when executed by the processor, cause that processor to detect feature information associated with a device to be registered. The computer program product transmits the feature information to a remote computer at a known address using a self-describing computer language. The computer program product registers the device by storing the feature information on the remote computer.

According to a further aspect of this invention, a processor and memory are configured to detect feature information associated with a device to be registered. The processor and memory transmit the feature information to a remote computer at a known address using a self-describing computer language. The processor and memory register the device by storing the feature information on the remote computer.

One or more advantages can be provided from the above. The user may quickly and easily register numerous devices. The user can configure devices without having to manually establish a communication link between the devices and the remote computer. The user can register devices without having to manually enter device-specific information into the remote computer. The devices may be automatically reconfigured with updated software packages. The user may remotely administer all devices using a standard web browser.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
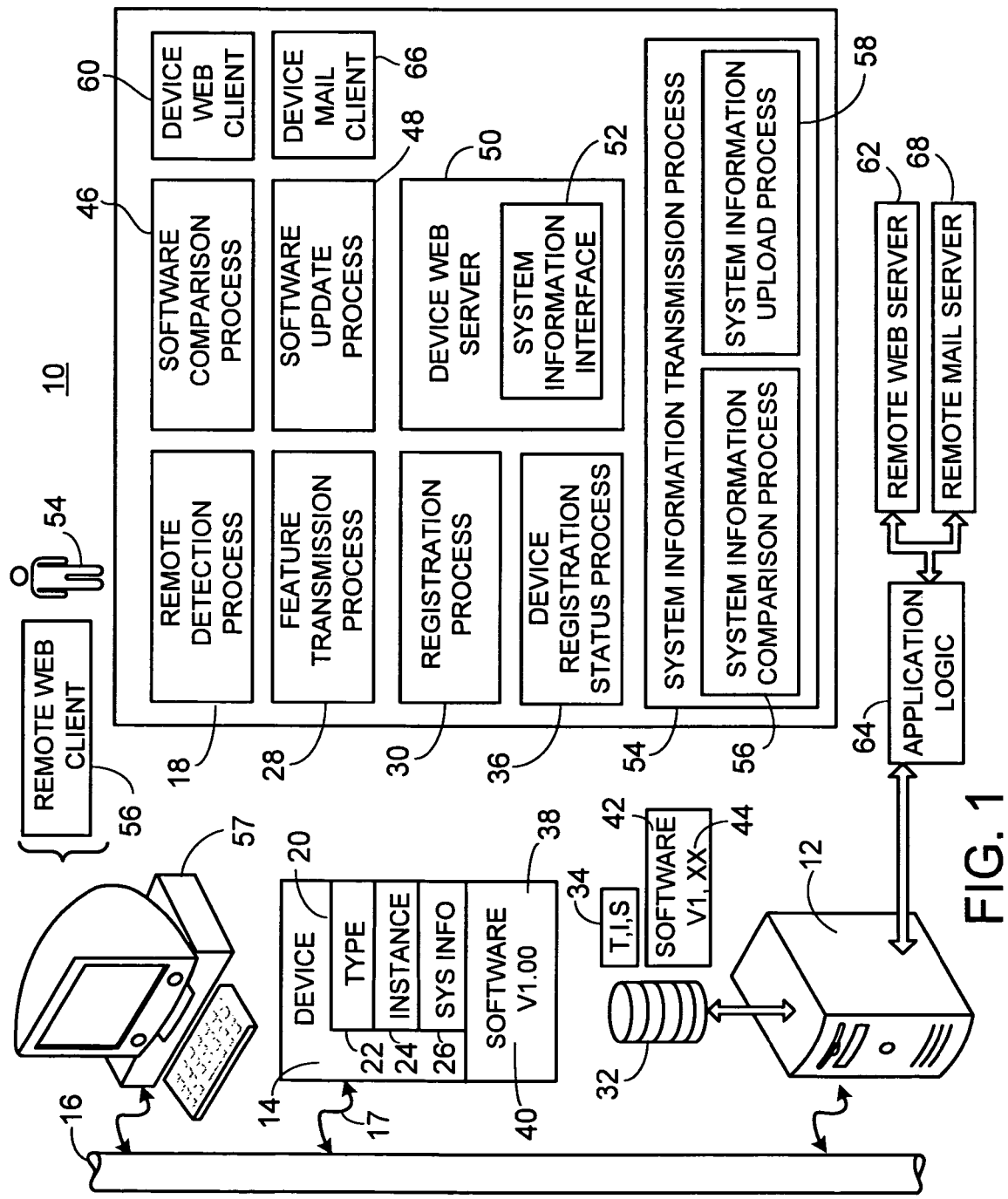
FIG. 1 is a diagrammatic view of the device registration process.

Referring to FIG. 1, there is shown an automated device recordation and registration process 10 for automatically registering, on a remote computer 12, an embedded device 14. Process 10 typically resides on and is incorporated into device 14. Device 14 is connected to a distributed computing network 16. Link 17, which connects device 14 to distributed computing network 16, can be any form of network connection, such as: a dial-up network connection via a modem (embedded into device 14); a direct network connection via a network interface card (embedded into device 14); a wireless network connection via any form of wireless communication chipset (embedded into device 14); and so forth. Distributed computing network 16 could be the Internet, an intranet, an extranet, a local area network (LAN), a wide area network (WAN), or any other form of network.

Process 10 includes feature detection process 18 for detecting feature information 20 associated with the device 14 to be registered. Feature information 20 is stored in device 14 on any standard memory storage device (not shown), such as: random access memory; read only memory; a hard disk drive; etc. This standard memory storage device is incorporated into device 14. Feature information 20 can include many different pieces of information which are associated with device 14 itself. For example: a device type 22 may specify the device name or model number (e.g. "OCD 950" or "HimaLaya") of device 14; a device instance 24 may specify a serial number of device 14; and system information 26 may specify various pieces of device or owner specific information (e.g. owner name, device location, device software version, device configuration, installed device options, installed device peripherals, etc.).

Process 10 includes a feature transmission process 28 for transmitting feature information 20 to remote computer 12 which resides at a known address on distributed computing network 16. This known address can be in the form of a Uniform Resource Locator (URL) address (e.g. www.remotecomputer.com) or a Transmission Control Protocol/Internet Protocol (TCP/IP) address (e.g. 209.6.72.87). This known address is included in feature information 20. Feature transmission process 28 transmits feature information 20 to remote computer 12 using a self-describing computer language, such as eXtensible Markup Language (XML). Remote computer 12 is typically a network server residing on distributed computing network 16.

A registration process 30 registers device 14 by sending feature information 20 to remote computer 12 where it is stored. Remote computer 12 can store feature information 20 on any standard memory storage device (not shown), such as: random access memory; read only memory; hard disk drives; RAID (redundant array of independent disks) arrays; etc. This standard memory storage device is incorporated into remote computer 12.

Remote computer 12 includes database 32 for storing feature information 20. Database 32 is typically a relational database such as Oracle™, Sybase™, or Access™. Registration process 30 typically encompasses remote computer 12 establishing or updating a record 34 on database 32 for device 14, where record 34 includes feature information 20, namely device type 22, device instance 24 and system information 26 (shown, for illustrative purposes, as "T, I, S" in record 34).

Process 10 includes a device registration status process 36 for examining database 32 to determine if device 14 was previously registered on remote computer 12. As device 14 includes a device instance 24 (typically a serial number), device registration status process 36 will examine database 32 to see if a record 34 exists on database 32 for device 14. In the event that device 14 has not been registered on database 32 (or the information on database 32 is incorrect/outdated), device registration status process 36 will initiate registration process 30 to register device 14 on database 32. This process 36 can be instituted at various times to ensure that device 14 is registered on database 32. For example, each time device 14 is powered-up (i.e. the device power is turned on), device registration status process 36 can determine whether device 14 is registered on remote computer 12. Accordingly, whenever a device 14 is initially installed and powered-up, registration is automatic; as device registration status process 36 will communicate over distributed computing network 16 and check remote computer 12 to determine if device 14 is registered on database 32. This results in a system in which registration is automatic.

Device 14 includes embedded software 38 which controls the functionality of device 14. Device 14 can be any of a large number of possibilities. Typical examples of device 14 might be: valve actuators in industrial controls; damper actuators in building automation systems; switch actuators in power generation systems; and so forth. Accordingly, the functionalities that embedded software 38 in these particular devices 14 would control are: the opening and closing of the valve; the opening and closing of the damper; and the opening or closing of the switch, respectively. As with most software packages, a software version number 40 is associated with embedded software 38 to facilitate easy software version comparison. Database 32 stores a software update 42 having a specific software version number 44 associated with it, where software update 42 is the newest version of embedded software 40 available for device 14.

Software comparison process 46 compares the version identifier 40 of embedded software 38 to the version identifier 44 of software update 42 to determine if the software update is newer (e.g. has a higher or newer version identifier) than the embedded software 38 installed on device 14. In the event that software comparison process 46 determines that software update 42 is newer than embedded software 38, embedded software 38 will be updated with software update 42.

Software update process 48, which is initiated in response to software comparison process 46 determining that embedded software 38 needs to be updated, retrieves software update 42 from remote computer 12 via distributed computing network 16. Accordingly, software update 42 is installed of device 14 by software update process 48 and embedded software 38 is either deleted, deactivated, or overwritten.

Device 14 includes a HyperText Transfer Protocol (HTTP) device web server 50. System information interface 52 resides on device web server 50 and is written in a language executable by device web server 50 (e.g. CGI, ISAPI, Java Servlets, ASP, and so forth). System information interface 52 allows the owner 54 of device 14 to access and edit system information 26 via some form of remote web client 56 executed on remote workstation 57. Examples of remote web client 56 would be any form of web browser (e.g. Microsoft Internet Explorer™, Netscape Navigator™, and so forth), or any form of custom application interface which allows owner 54 to access and modify system information 26 stored on device 14.

Whenever user 54 modifies system information 26 via system information interface 52, system information transmission process 54 transmits this "newly modified" system information 26 from device 14 to remote computer 12 for storing in database 32. System information transmission process 54 transmits system information 26 to remote computer 12 using a self-describing computer language, such as eXtensible Markup Language (XML).

System information transmission process 54 includes system information comparison process 56 for comparing system information 26 stored on device 14 to the system information (shown a "S" in item 34) stored on database 32 of remote computer 12 to determine if database 32 needs to be updated. As system information 26 is "owner editable" by owner 54, in the event that the system information on device 14 differs from the system information of database 32, database 32 needs to be updated with system information 26.

System information transmission process 54 includes a system information upload process 58. In the event that system information comparison process 56 determines that the system information on device 14 varies from the system information on database 32, system information upload process 58 transmits system information 26 from device 14 to remote computer 12 via distributed computing network 16. Accordingly, system information 26 is stored on database 32 of remote computer 12 and the "outdated" system information is either deleted, deactivated, or overwritten.

Device 14 includes a device web client 60 and remote computer 12 includes a HyperText Transfer Protocol (HTTP) remote web server 62. Application logic 64 interfaces remote web server 62 and database 32. Feature transmission process 28 utilizes device web client 60 to upload feature information 20 from device 14 to remote web server 62. Application logic 64 transfers feature information 20 from remote web server 62 to database 32.

Device 14 includes a device mail client 66 and remote computer 12 includes a Simple Mail Transfer Protocol (SMTP) remote mail server 68. Application logic 64 interfaces remote mail server 68 and database 32. Feature transmission process 28 utilizes device mail client 66 to upload feature information 20 from device 14 to remote mail server 68. Application logic 64 transfers feature information 20 from remote mail server 68 to database 32.

Figure 2:
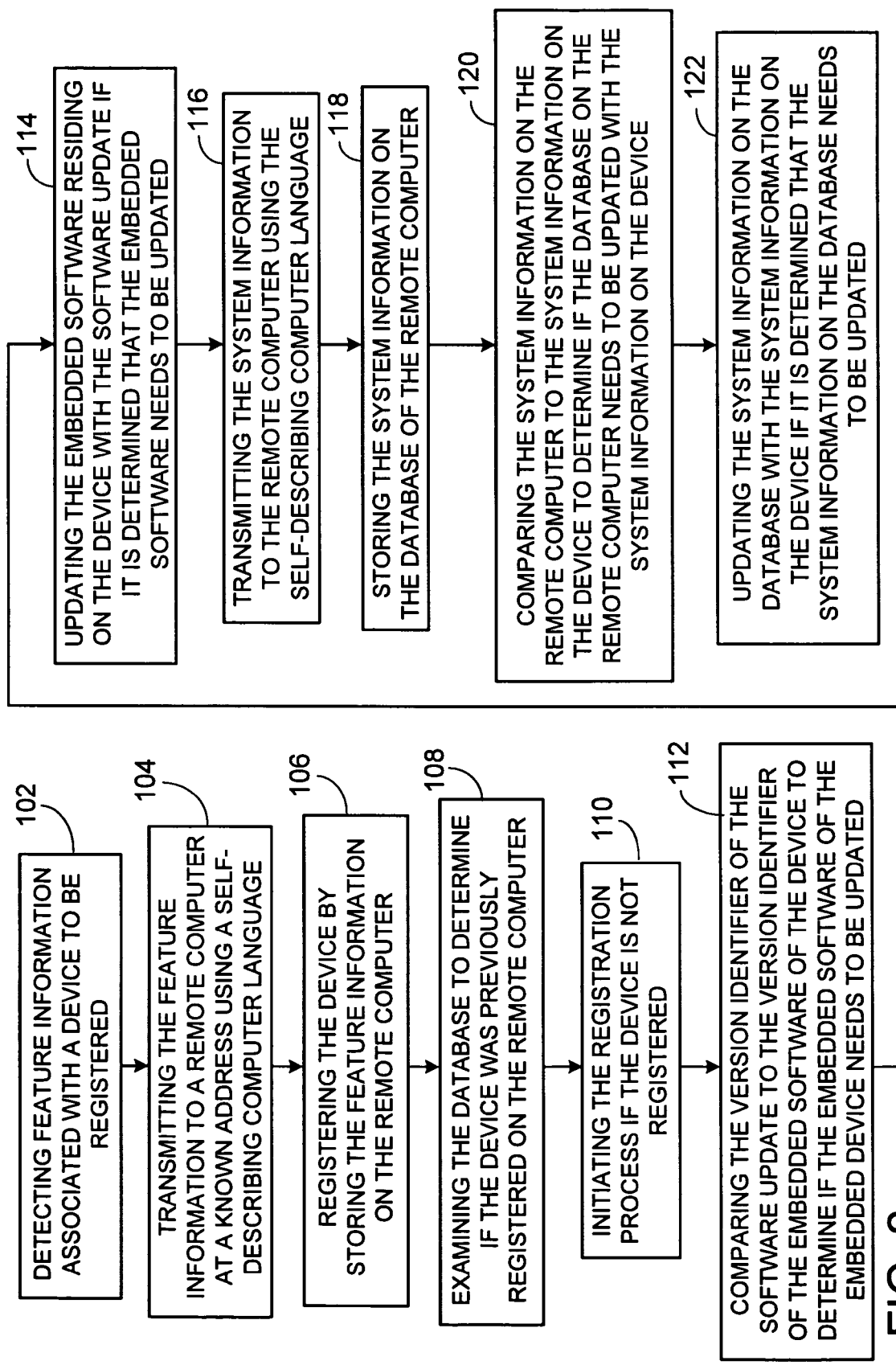
FIG. 2 is a flow chart of the device registration method.

Now referring to FIG. 2, there is shown a method 100 for registering, on a remote computer, a device embedded in an apparatus. A feature detection process detects 102 feature information associated with a device to be registered. A feature transmission process transmits 104 that feature information to a remote computer at a known address using a self-describing computer language. The self-describing computer language includes eXtensible Markup Language (XML) and the known address can be a Uniform Resource Locator (URL), a Transmission Control Protocol/Internet Protocol (TCP/IP) address, and so forth. A registration process then registers 106 the device by storing the feature information on the remote computer. The remote computer includes a database for storing this feature information. The feature information can include many different pieces of information associated with the device itself, such as: a device type which specifies the device name or model number (e.g. "OCD 950" or "HimaLaya") of a device; a device instance which specifies a serial number of the device or some other unique identifier (such as a UUID Universally Unique Identifier); and system information which specifies various pieces of device or owner specific information (e.g. owner name, device location, device software version, etc.).

A device registration status process examines 108 the database to determine if the device was previously registered on the remote computer. If the device is not registered, the device registration status process initiates 110 the registration process. The device includes embedded software which controls the device's functionality, where the embedded software has a specific version identifier associated with it. The database of the remote computer stores a software update, which has a specific version identifier associated with it, for the embedded software of the device. This software update is the newest version of embedded software available for the device. A software comparison process compares 112 the version identifier of the software update to the version identifier of the embedded software of the device to determine if the embedded software of the device needs to be updated. If it is determined that the embedded software needs to be updated, a software update process updates 114 the embedded software residing on the device with the software update.

Figure 3:
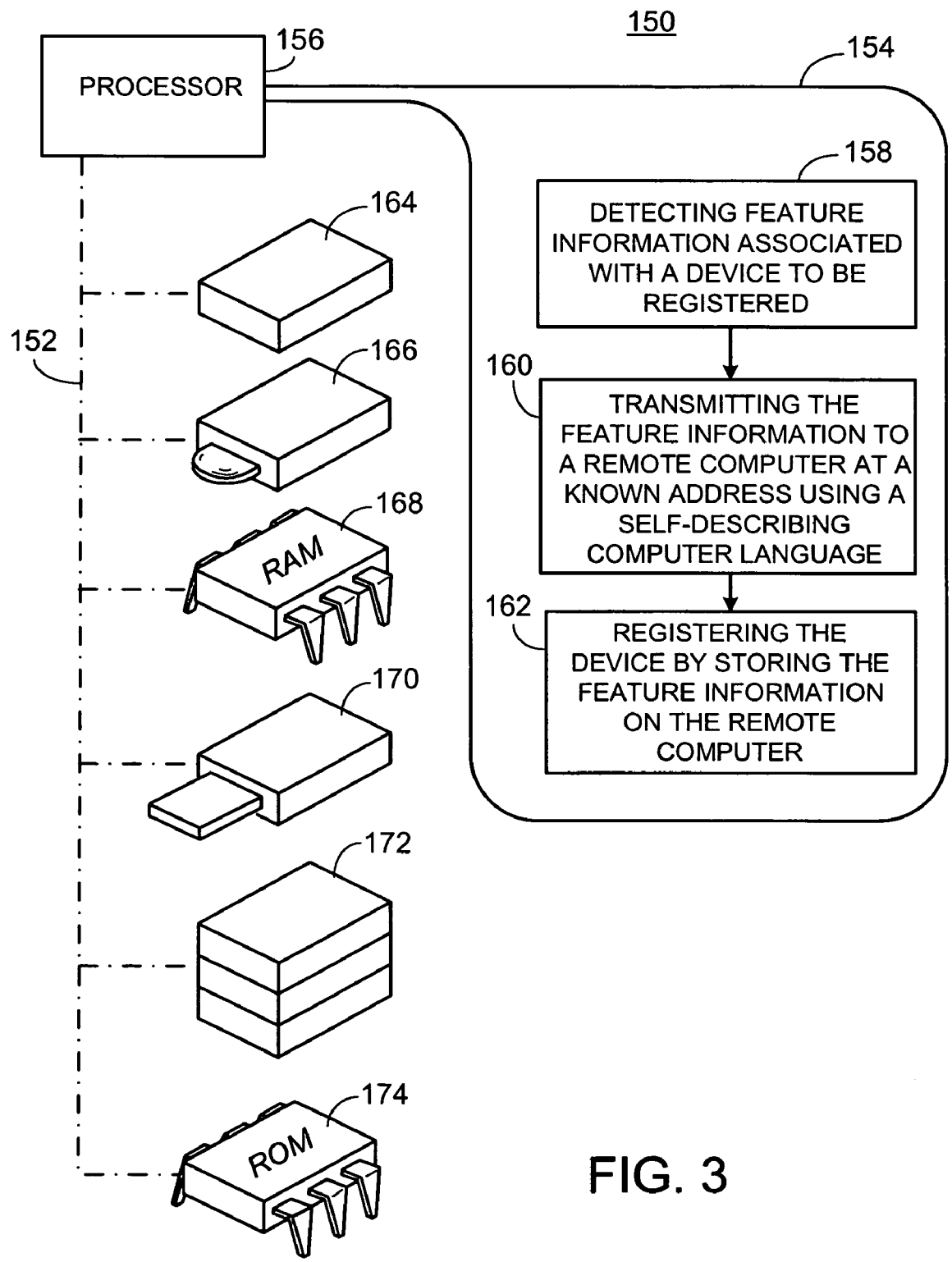
FIG. 3. is a diagrammatic view of another embodiment of the device registration process, including a processor and a computer readable medium, and a flow chart showing a sequence of steps executed by the processor.

A system information interface allows the owner of the device to configure the system information. A system information transmission process transmits 116 the system information to the remote computer using the self-describing computer language. The system information transmission process then stores 118 the system information on the database of the remote computer. A system information comparison process makes a comparison 120 between the system information on the remote computer and the system information on the device to determine if the database on the remote computer needs to be updated with the system information on the device. If it is determined that the system information on the database needs to be updated, a system information upload process updates 122 the system information on the database with the system information on the device Now referring to FIG. 3, there is shown a computer program product 150 which is stored and executed on a device to be automatically registered on a remote computer. Computer program product resides on a computer readable medium 152 having a plurality of instructions 154 stored thereon. When executed by processor 156, instructions 154 cause processor 156 to detect 158 feature information associated with a device to be registered. Computer program product 150 transmits 160 the feature information to a remote computer at a known address using a self-describing computer language, and registers 162 the device by storing the feature information on the remote computer.

Typically embodiments of computer readable medium 152 are: hard drive 164; optical drive 166; random access memory 168; tape drive 170; RAID array 172; and read only memory 174.

Figure 4:
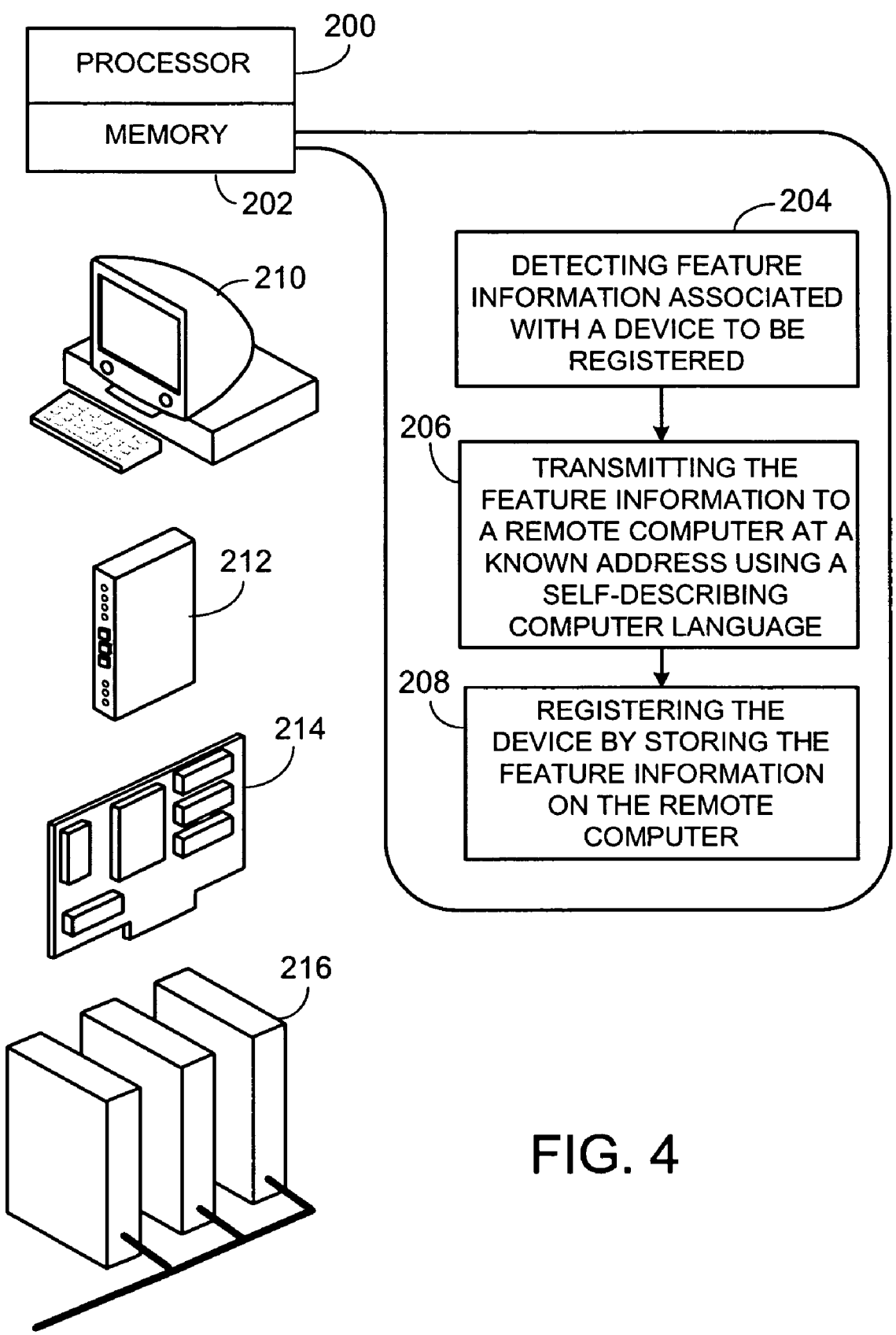
FIG. 4. is a diagrammatic view of another embodiment of the device registration process, including a processor and memory, and a flow chart showing a sequence of steps executed by the processor and memory.

Now referring to FIG. 4, there is shown a processor 200 and memory 202 configured to detect 204 feature information associated with a device to be registered. Processor 200 and memory 202 transmits 206 the feature information to a remote computer at a known address using a self-describing computer language, and registers 208 the device by storing the feature information on the remote computer.

Processor 200 and memory 202 may be incorporated into a personal computer 210, a programmable logic controller 212, a single board computer 214, or an array of network servers 216.

A number of embodiments of the invention have been described. Nevertheless, it will be understood that various modifications may be made without departing from the spirit and scope of the invention.

What is claimed is:

1. A method to register a device with a remote computer, the method comprising:
communicating with the remote computer each time the device powers-up; and
making a determination, each time the device powers-up, as to whether to proceed with registration based on communication with the remote computer, wherein the determination is made based on correctness of registration information stored on the remote computer for the device and currency of the registration information;
wherein, if the determination is not to proceed with registration, the method further comprises aborting registration for a current power-up of the device;
wherein, if the determination is to proceed with registration, for the current power-up of the device the method further comprises:
obtaining feature information stored for the device, the feature information comprising information that is specific to an instance of the device, the feature information comprising an address of the remote computer and a physical location of the device, the address comprising a known address that is stored prior to installation of the device in a system; and
registering the device with the remote computer by transmitting the feature information to the remote computer at the known address using eXtensible Markup Language (XML); and
wherein the method is performed automatically without manual intervention.

2. The method of claim 1, wherein the known address corresponds to a Uniform Resource Locator (URL).

3. The method of claim 1, wherein the known address corresponds to a Transmission Control Protocol/Internet Protocol (TCP/IP) address.

4. The method of claim 1, wherein the information comprises a device type and a device instance.

5. The method of claim 4, wherein the device type comprises a model number of the device and the device instance comprises a serial number of the device.

6. The method of claim 1, wherein the remote computer comprises a database for storing the feature information.

7. The method of claim 1, wherein the remote computer resides on a distributed computing network and the feature information is transmitted to the remote computer via the distributed computing network.

8. The method of claim 7, wherein the distributed computing network comprises the Internet.

9. The method of claim 7, wherein the device is connected to the distributed computing network via a direct network connection.

10. The method of claim 7, wherein the device is connected to the distributed computing network via a dial-up network connection.

11. The method of claim 7, wherein the device is connected to the distributed computing network via a wireless network connection.

12. The method of claim 6, wherein the device stores embedded software which controls the device, the embedded software having a first version identifier.

13. The method of claim 12, wherein the database stores a software update having a second version identifier, the software update comprising a different version of the embedded software.

14. The method of claim 13, further comprising comparing the first version identifier to the second version identifier to determine if the embedded software needs to be updated.

15. The method of claim 14, further comprising updating the embedded software using the software update if it is determined that the embedded software needs to be updated.

16. The method of claim 6, wherein the feature information comprises system information concerning ownership and configuration of the device.

17. The method of claim 16, further comprising configuring the system information via a system information interface.

18. The method of claim 17, wherein the device comprises a HyperText Transfer Protocol (HTTP) device web server and the system information interface comprises a software application residing on the device web server, and the method further comprises:
    editing the system information by accessing the system information interface via a remote web client.

19. The method of claim 17, further comprising:
    transmitting the system information to the remote computer using XML.

20. The method of claim 19, wherein making the determination comprises comparing system information on the remote computer to system information on the device to determine if the database on the remote computer needs to be updated with the system information on the device.

21. The method of claim 20, further comprising updating system information in the database with the system information from the device.

22. The method of claim 6, wherein the device comprises a device web client and the remote computer comprises a HyperText Transfer Protocol (HTTP) remote web server.

23. The method of claim 22, wherein the remote computer comprises application logic to interface the remote web server and the database.

24. The method of claim 23, wherein the device web client transmits the feature information from the device to the remote web server, and the application logic transmits the feature information from the remote web server to the database.

25. The method of claim 6, wherein the device comprises a device mail client and the remote computer comprises a Simple Mail Transfer Protocol (SMTP) remote mail server.

26. The method of claim 25, wherein the remote computer comprises application logic to interface the remote mail server and the database.

27. The method of claim 26, wherein the device mail client transmits the feature information from the device to the remote mail server, and the application logic transmits the feature information from the remote mail server to the database.

28. One or more machine-readable media that store instructions that are executed to register a device with a remote computer, the instructions to:
    communicate with the remote computer each time the device powers-up; and
    make a determination, each time the device powers-up, as to whether to proceed with registration based on communication with the remote computer, wherein the determination is made based on correctness of registration information stored on the remote computer for the device and currency of the registration information;
    if the determination is not to proceed with registration, to abort registration for a current power-up of the device; and
    if the determination is to proceed with registration, to perform the following actions for the current power-up of the device:
        obtain feature information stored for the device, the feature information comprising information that is specific to an instance of the device, the feature information comprising an address of the remote computer and a physical location of the device, the address comprising a known address that is stored prior to installation of the device in a system; and
        register the device with the remote computer by transmitting the feature information to the remote computer at the known address using eXtensible Markup Language (XML);
    wherein obtaining and registering are performed automatically when the instructions are executed and without manual intervention.

29. The one or more machine-readable media of claim 28, wherein the known address corresponds to a Uniform Resource Locator (URL).

30. The one or more machine-readable media of claim 28, wherein the known address corresponds to a Transmission Control Protocol/Internet Protocol (TCP/IP) address.

31. The one or more machine-readable media of claim 28, wherein the feature information comprises a device type and a device instance.

32. The one or more machine-readable media of claim 28, wherein the feature information comprises system information concerning ownership and configuration of the device.

33. The one or more machine-readable media of claim 32, further comprising instructions that cause the device to receive the system information.

34. The one or more machine-readable media of claim 33, further comprising instructions to:
    transmit the system information to the remote computer using XML.

35. A device that registers with a remote computer, the device comprising a processing device that executes instructions to:
    communicate with the remote computer each time the device powers-up; and
    make a determination, each time the device powers-up, as to whether to proceed with registration based on communication with the remote computer, wherein the determination is made based on correctness of registration information stored on the remote computer for the device and currency of the registration information;
    if the determination is not to proceed with registration, to abort registration for a current power-up of the device; and
    if the determination is to proceed with registration, to perform the following actions for the current power-up of the device:
        obtain feature information stored for the device, the feature information comprising information that is specific to an instance of the device, the feature information comprising an address of the remote computer and a physical location of the remote computer, the address comprising a known address that is stored prior to installation of the device in a system; and register the device with the remote computer by transmitting the feature information to a remote computer at the known address using eXtensible Markup Language (XML);

wherein obtaining and registering are performed automatically when the instructions are executed by the processor without manual intervention.

36. The device of claim 35, wherein the known address corresponds to a Uniform Resource Locator (URL).

37. The device of claim 35, wherein the known address corresponds to a Transmission Control Protocol/Internet Protocol (TCP/IP) address.

38. The device of claim 35, wherein the information comprises a device type and a device instance.

39. The device of claim 38, wherein the device type comprises a model number of the device and the device instance comprises a serial number of the device.

40. The device of claim 35, wherein the feature information comprises system information concerning ownership and configuration of the device.

41. The device of claim 40, wherein the processing device executes instructions to receive the system information.

42. The device of claim 41, wherein the processing device executes instructions to:

transmit the system information to the remote computer using XML.

* * * * *

UNITED STATES PATENT AND TRADEMARK OFFICE
CERTIFICATE OF CORRECTION

| | | |
|---|---|---|
| PATENT NO. | : 7,149,792 B1 | Page 1 of 1 |
| APPLICATION NO. | : 09/716717 | |
| DATED | : December 12, 2006 | |
| INVENTOR(S) | : James R. Hansen and Dale E. Calder | |

It is certified that error appears in the above-identified patent and that said Letters Patent is hereby corrected as shown below:

Column 8, Claim 4, Line 42;
Insert --feature-- before "information"

Signed and Sealed this

First Day of May, 2007

JON W. DUDAS
*Director of the United States Patent and Trademark Office*